US009430397B2

(12) United States Patent
Hondo

(10) Patent No.: US 9,430,397 B2
(45) Date of Patent: Aug. 30, 2016

(54) PROCESSOR AND CONTROL METHOD THEREOF

(71) Applicant: FUJITSU LIMITED, Kawasaki-shi, Kanagawa (JP)

(72) Inventor: Mikio Hondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 379 days.

(21) Appl. No.: 14/012,699

(22) Filed: Aug. 28, 2013

(65) Prior Publication Data

US 2013/0346702 A1   Dec. 26, 2013

Related U.S. Application Data

(63) Continuation of application No. PCT/JP2011/055845, filed on Mar. 11, 2011.

(51) Int. Cl.
G06F 12/08 (2016.01)

(52) U.S. Cl.
CPC ....... *G06F 12/0895* (2013.01); *G06F 12/0817* (2013.01)

(58) Field of Classification Search
None
See application file for complete search history.

(56) References Cited

U.S. PATENT DOCUMENTS

| 2003/0079086 | A1 | 4/2003 | Shanahan et al. |
| 2007/0156964 | A1* | 7/2007 | Sistla ................ G06F 12/121 711/133 |
| 2009/0240893 | A1 | 9/2009 | Sugizaki et al. |
| 2011/0213933 | A1 | 9/2011 | Maeda et al. |

FOREIGN PATENT DOCUMENTS

| JP | 4-315235 | 11/1992 |
| JP | 5-120139 | 5/1993 |
| JP | 2003-186742 | 7/2003 |
| JP | 2009-223759 | 10/2009 |
| WO | 2010/052799 A1 | 5/2010 |

OTHER PUBLICATIONS

"Set Associative Cache". University of Maryland College Park. Publisehd in Summer 2003. <https://www.cs.umd.edu/class/sum2003/cmsc311/Notes/Memory/set.html>.*
PCT International Preliminary Report on Patentability issued Sep. 26, 2013 in corresponding International Application No. PCT/JP2011/055845.
International Search Report mailed Apr. 19, 2011 for corresponding International Application No. PCT/JP2011/055845.
Office Action mailed Jan. 21, 2016 in corresponding Chinese Patent Application No. 201180068959.3.

* cited by examiner

*Primary Examiner* — Charles Rones
*Assistant Examiner* — Hewy Li
(74) *Attorney, Agent, or Firm* — Staas & Halsey LLP

(57) ABSTRACT

A processor includes a directory cache provided with a data cache, a memory directory to hold directory information, to hold dirty information indicating if held directory information is the same as that held in the memory directory, and local information indicating that the directory information of the memory directory is not held in a data cache of a different processor when the directory information from the memory directory is registered, and makes a setting such that the directory information of the memory directory is the same as directory information held in a data cache of a different processor as dirty information of the directory cache when the directory information of the directory cache and the local information of the directory cache indicate that the directory information of the memory directory is not held in the data cache of the different processor.

9 Claims, 8 Drawing Sheets

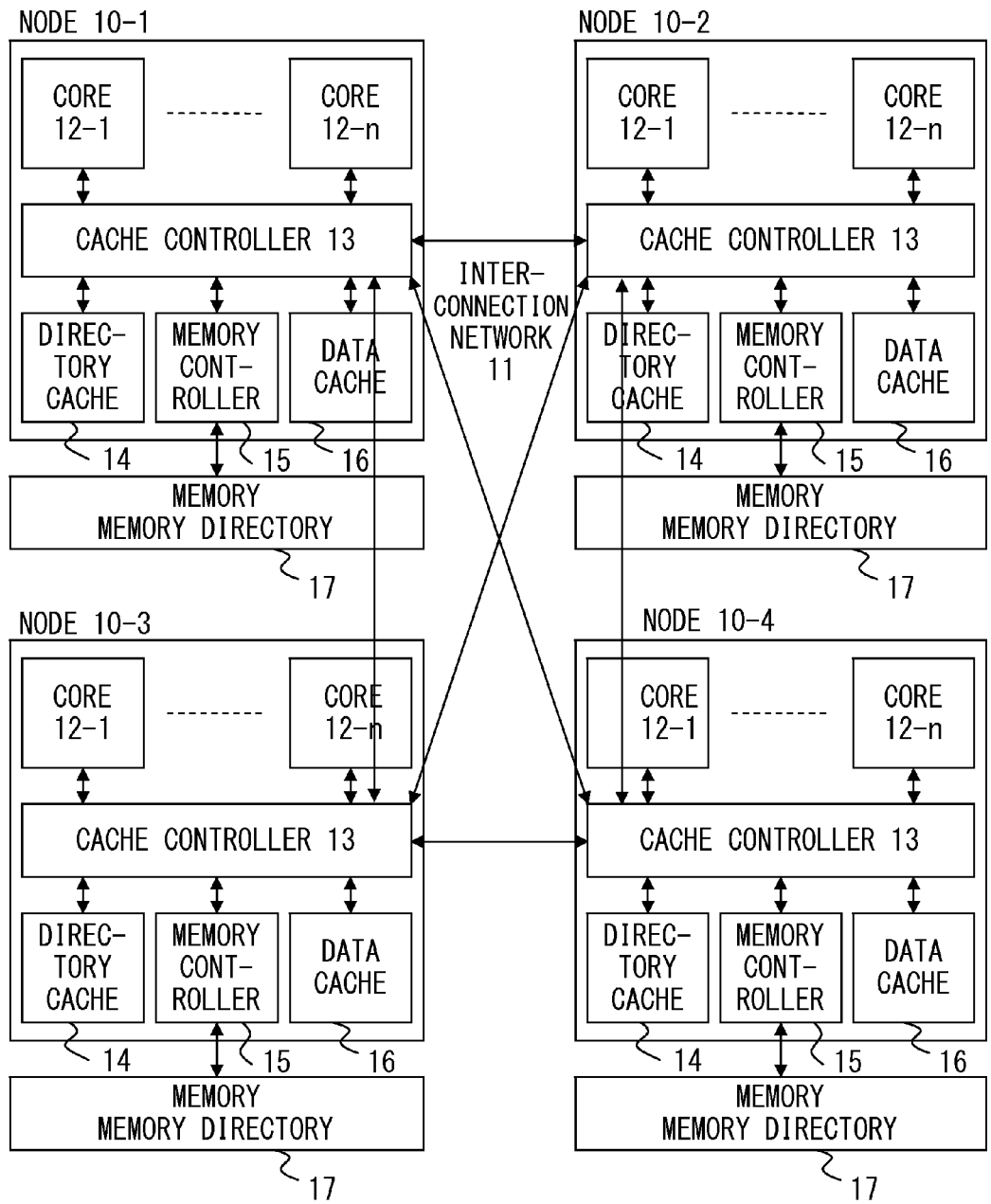
F I G. 1

DIRECTORY CACHE

| VALIDITY | ADDRESS | DIRECTORY | DIRTY | L FLAG |
|----------|---------|-----------|-------|--------|
|          |         |           |       |        |

FIG. 3(a)

MEMORY          MEMORY DIRECTORY

| MEMORY DATA | DIRECTORY |
|-------------|-----------|
|             |           |

FIG. 3(b)

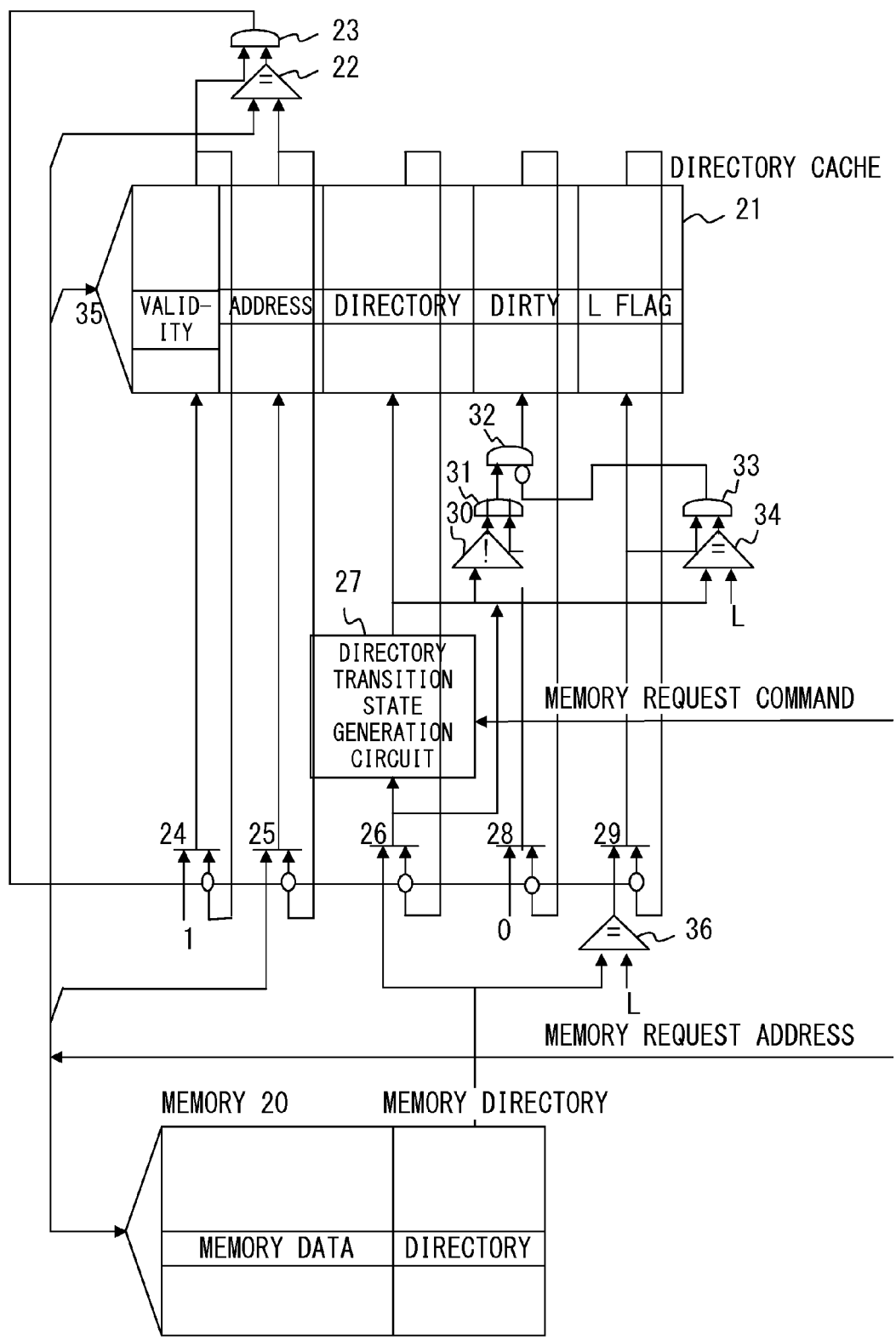
F I G. 4

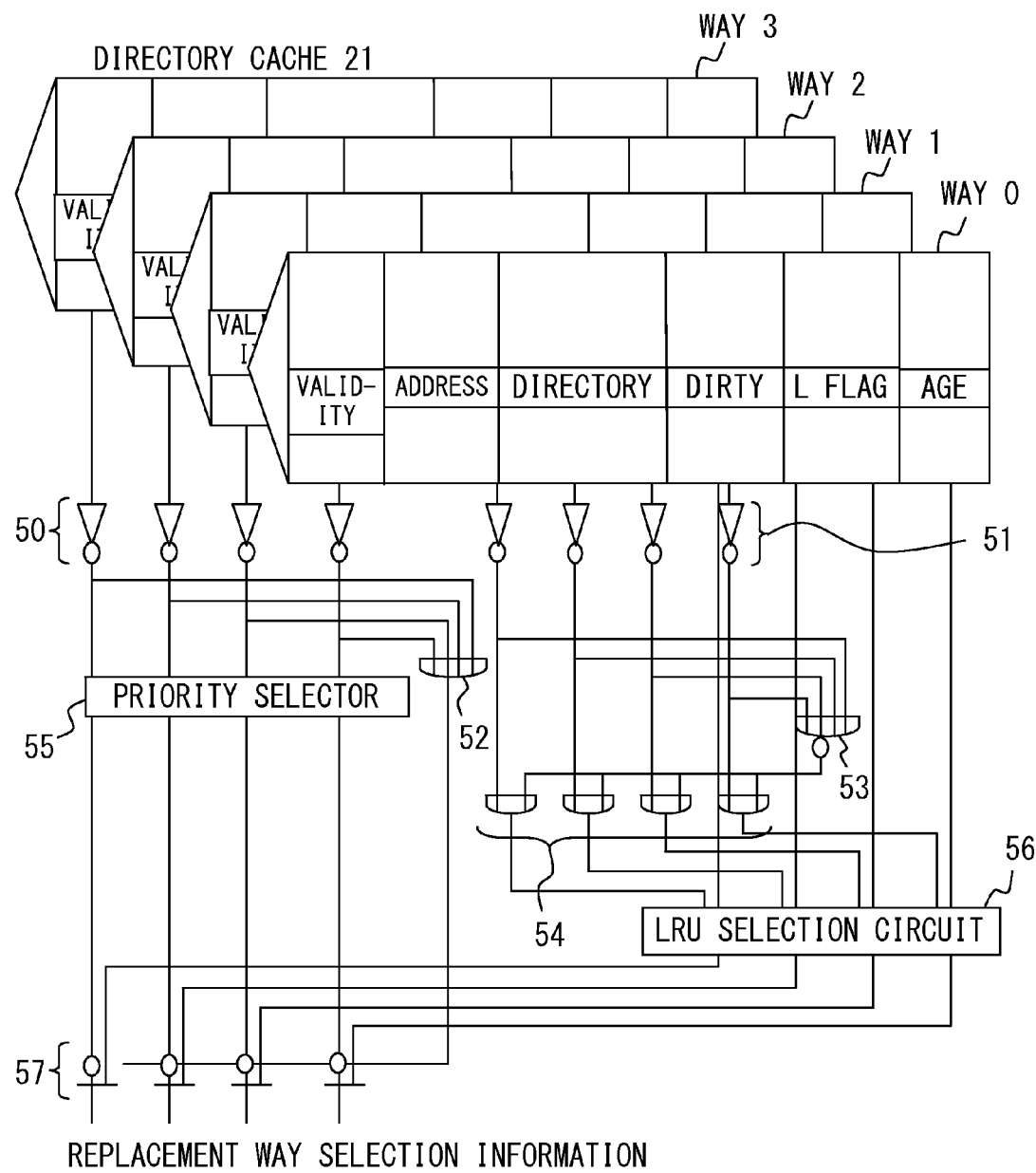
F I G. 6

PROCESSOR AND CONTROL METHOD THEREOF

CROSS-REFERENCE TO RELATED APPLICATION

This application is a continuation application of International PCT Application No. PCT/JP2011/055845 which was filed on Mar. 11, 2011.

FIELD

The embodiments discussed here are related to a processor, and a control method thereof.

BACKGROUND

FIG. 1 is a block diagram illustrating a configuration of a shared memory type computer as an information processing device including nodes as processors of a directory scheme.

The plurality of nodes 10-1 to 10-4 are interconnected by an interconnection network 11. In each of the nodes 10-1 to 10-4, CPU (Central Processing Unit) cores 12-1 to 12-$n$, which are processing units, are provided. A configuration where a plurality of CPU cores are provided in one node in this way is referred to as a multi-core configuration. The CPU cores 12-1 to 12-$n$ are respectively connected to a data cache 16 via a cache controller 13. Moreover, to the cache controller 13, a directory cache 14, and a memory controller 15 are connected. The cache controller 13 controls accesses that the CPU cores make to the data cache 16 or the directory cache 14. To the memory controller 15, a memory 17 as a main storage device is connected. The memory controller 15 controls accesses that the CPU cores make to the memory 17. In a shared memory type computer of a directory scheme, a memory directory is provided in the memory 17.

In directory information of the memory directory, a cache state where each data of the memory 17 is cached in a different node is recorded. Moreover, in the directory information of the memory directory, identification information of a different node, which indicates a node where data is cached, is stored.

In the directory cache 14, dirty information indicating the possibility that directory information is updated in the directory cache and does not match directory information of a memory directory is held in addition to address information and directory information of the corresponding memory directory. The directory information is composed of status information indicating a cache state where memory data corresponding to the directory information is cached in a different node, and information indicating a node where the memory data is cached. The following description assumes that status information included in directory information are compared when the directory information are compared. The dirty information is set to C (Clean) if directory information of the directory cache matches that of a memory directory, or set to D (Dirty) if the directory information of the directory cache mismatches the directory information of the memory directory. For example, when directory information of data that is not cached in a different node is stored in the directory cache 14, dirty information of the directory information is set to C (Clean). Next, when data is read from the different node to the memory 17 of a local node, dirty information of the corresponding directory information in the directory cache 14 is set to D (Dirty). Thereafter, when the data is written back from the different node to the memory 17 of the local node, the corresponding directory information in the directory cache 14 is restored to a state before the information becomes dirty. However, the dirty information corresponding to the directory information is left unchanged as the D (Dirty) state.

FIG. 2 illustrates a configuration of a conventional directory cache, and that of a memory including a memory directory.

FIG. 2($a$) illustrates the directory cache. In the directory cache, a validity flag indicating validity or invalidity of each entry, an address of data corresponding to each entry within the memory, directory information of the data, and dirty information indicating whether or not the directory information of the entry is changed. FIG. 2($a$) depicts that the directory cache is configured with a direct map scheme. If an N-way set associative scheme is adopted, the N configurations of FIG. 2($a$) are prepared in parallel.

FIG. 2($b$) illustrates the memory including the memory directory. In the memory, memory data is stored. At the same time, directory information indicating a cache state where the memory data is held in a data cache of a remote node (different node) is stored. As the directory information, any of L (Local) indicating that data is not held in a data cache of a remote node, REX (Remote EXclusive) indicating that data is exclusively held in a data cache of a remote node, and RSH (Remote SHare) indicating that data is held in a data cache of a remote node and permitted to be shared, and identification information of a node where memory data is cached, are stored. Here, exclusively holding data in a data cache of a remote node means that only the remote node is allowed to access the data.

When an access is made from a CPU core of a home node or a remote node to the memory data of the memory, directory information is updated, and contents of the directory information are written to the directory cache.

The dirty information is updated to D (Dirty) when the directory information is updated even once in the directory cache. Therefore, the dirty information is not restored to C (Clean) even if the directory information of the directory cache and that of the memory directory match.

Unlike data of the data cache, however, the directory information of the directory cache that is once updated is again restored to the former state, which is the same as that of the memory directory, in many cases.

Assume a case where data at a certain address in the memory is not held in a data cache of an arbitrary node and directory information of the memory is not held in the directory cache (normal initial state). At this time, the directory information of the memory directory is L (Local). When a request to reference the memory data is issued from a remote node (another node) different from a home node (local node) of the memory, the memory data is registered to the cache memory of the remote node, and the directory information of the memory directory is registered to the directory cache after being updated from L (Local) to RSH (Remote SHare). Moreover, the dirty information of the directory cache is set to D (Dirty). Thereafter, when the memory data registered to the data cache of the remote node is flushed back or written back to the memory of the home node due to replacement, the directory information of the directory cache is updated from RSH to L. Therefore, the directory information of the directory cache and that of the memory directory are restored to a state where they match. However, since the dirty information of the directory cache is once set to D (Dirty), it is disabled to be restored to C (Clean). Accordingly, directory information that is actually C (Clean) in the memory directory is written back to the memory when the directory information of the directory cache is replaced. The write-back performed when the directory information of the directory cache is replaced results in a write-back of the directory information that should be C (Clean). This is a useless memory access, leading to degradation of a throughput.

Conventional techniques include a technique for respectively attaching a cache TAG to a local node and a remote node in order to enable identification of whether cache data is either data of a local node or that of a remote node.

PRIOR ART DOCUMENTS

Patent Documents

[Patent Document 1] Japanese Laid-open Patent Publication No. 2009-223759
[Patent Document 2] Japanese Laid-open Patent Publication No. 2003-186742

SUMMARY

A processor according to one aspect of the embodiments, connected to a different processor via an interconnection network and also connected to a main storage device, includes a directory cache, provided with a data cache configured to hold data and a memory directory to hold directory information indicating whether or not data stored in a main storage device is held in a data cache of a different processor, configured to hold dirty information indicating whether or not held directory information is the same as that held in the memory directory, and local information indicating that the directory information of the memory directory is not held in a data cache of a different processor when the directory information from the memory directory is registered, and a control circuit configured to make a setting such that the directory information of the directory cache is the same as directory information held in a data cache of a different processor as dirty information of the directory cache when the directory information of the directory cache and the local information of the directory cache indicate that the directory information of the directory cache is not held in the data cache of the different processor.

According to the following embodiments, a directory cache control device that enables reductions in useless memory accesses, and further enables improvements in a memory throughput.

The object and advantages of the invention will be realized and attained by means of the elements and combinations particularly pointed out in the claims.

It is to be understood that both the forgoing general description and the following detailed description are exemplary and explanatory and are not restrictive of the embodiment, as claimed.

BRIEF DESCRIPTION OF DRAWINGS

FIG. 1 is a block diagram illustrating a configuration of a shared memory type computer of a directory scheme;
FIGS. 3(a) and 3(b) illustrate a configuration of a directory cache according to an embodiment, and that of a memory;
FIG. 4 illustrates a configuration of a directory cache control circuit according to the embodiment;
FIG. 6 illustrates a configuration for recognizing a clean entry among valid entries as a replacement target with priority.

DESCRIPTION OF EMBODIMENT

Figure 2:
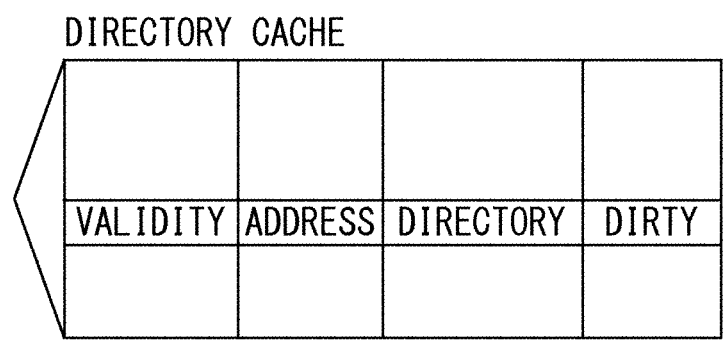
FIGS. 2(a) and 2(b) illustrate a configuration of a conventional directory cache, and that of a memory including a memory directory.
Figure 2:
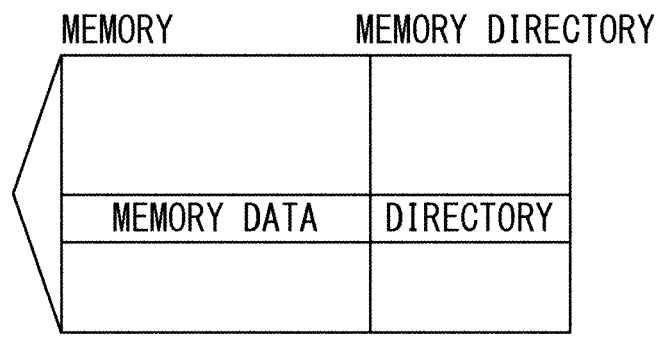

In an embodiment, L flag information indicating whether or not directory information of a memory directory is L (Local) is registered to a directory cache as additional information when a miss occurs in the directory cache and the directory information of the memory directory is registered to the directory cache.

Moreover, if the L flag information is "1" (if the directory information of the memory directory is L (Local)) when the directory information of the directory cache is updated to L (Local), dirty information of the directory cache is changed to C (Clean).

In this way, whether or not directory information of a memory directory corresponding to each entry of the directory cache is L (Local) is determined. Therefore, even if dirty information of the directory cache is D (Dirty), it is possible to change the dirty information of the directory cache to C (Clean) when both the directory information of the directory cache and that of the memory directory become L (Local).

As a result, even when the directory information of the directory cache is updated and the dirty information is once set to D (Dirty), it is possible to restore the dirty information to C (Clean). Accordingly, there is no need to perform a write-back at the time of replacement in the directory cache, thereby making it possible to prevent a useless memory access from occurring, and to prevent a throughput from being degraded.

FIG. 3 illustrates a configuration of the directory cache according to this embodiment, and that of the memory.

FIG. 3(a) illustrates the directory cache according to this embodiment, whereas FIG. 3(b) illustrates the memory common to conventional techniques.

As illustrated in FIG. 3(b), memory data and directory information of the memory data are stored in the memory similarly to the conventional techniques. Moreover, in the directory cache according to this embodiment, an L flag that corresponds to directory information of a corresponding entry and indicates whether or not directory information of the memory is L (Local) is stored in addition to a conventional validity flag, address, directory information, and dirty information as illustrated in FIG. 3(a). FIG. 3(a) illustrates the directory cache configured with a 1-way direct map scheme using one way. By preparing N ways, an N-way set associative scheme is also adoptable.

FIG. 4 illustrates a configuration of a directory cache control circuit according to this embodiment.

A memory request address from a CPU core is transmitted to a memory 20, and also transmitted to a directory cache 21. The memory request address is used to access (35) an entry of the directory cache 21, and input to a comparator 22. To the comparator 22, also an address of the entry retrieved with the access 35 is input. The comparator 22 performs a comparison of whether or not the memory request address and the address read from the directory cache 21 are equal. If they are equal, the comparator 22 outputs "1". To an AND circuit 23, an output of the comparator 22 and a validity flag are input. The AND circuit 23 ANDs the output and the validity flag, and outputs a result. Namely, if the validity flag of the entry retrieved with the memory request address is "1" (valid entry), and if the address held in the entry and the memory request address are equal, the AND circuit 23 outputs "1". The output of the AND circuit 23 is input to selectors 24-26, 28, and 29 as a switching signal of the selectors 24-26, 28, and 29. A circle represented at the selectors 24-26, 28, and 29 indicates a signal on a side selected when the switching signal is "1".

If the output of the AND circuit 23 is "0", namely, if an entry where a validity flag is "1" and a held address is equal is not present for the retrieved entry, the selector 24 selects the value "1" among inputs of the selector 24, and sets the validity flag of the entry to "1". If the output of the AND circuit 23 is "1", namely, if the entry where the validity flag is "1" and the held address is equal is present for the retrieved entry, the validity flag read from the entry is set to the validity flag unchanged. The other selectors are similar. Namely, an input indicated with a circle is selected when the output of the AND circuit 23 is "1". Otherwise, the other input is selected.

To the selector 25, the memory request address, and an address read from the directory cache 21 are input. The selector 25 selects either of the addresses by using the output of the AND circuit 23 as a switching signal. If the output of the AND circuit 23 is "1", this indicates that a valid entry holding the address requested with the memory request address is present in the directory cache 21. Accordingly, if the output of the AND circuit 23 is "1", the address read from an address area of the directory cache 21 is written back to the original address area of the entry unchanged. If the output of the AND circuit 23 is "0", this indicates that the valid entry holding the address requested with the memory request address is not present. Accordingly, in this case, the memory request address is written to the address area in order to newly create a valid entry in the currently accessed entry.

To the selector 26, directory information read form the memory 20 with the memory request address, and that read from the directory cache 21 are input. The selector 26 outputs the directory information read from the memory directory of the memory 20 if the output of the AND circuit 23 is "0", or outputs the directory information read from the directory cache 21 if the output of the AND circuit 23 is "1". To a directory transition state generation circuit 27, the output of the selector 26 is input. The directory transition state generation circuit 27 rewrites contents of the directory information according to a memory request command issued from a request source node, and writes the rewritten contents to a directory area of the directory cache 21. The directory transition state generation circuit 27 will be described in detail later.

To the selector 29, an output of a comparator 36, which indicates whether or not the directory information read from the memory directory of the memory 20 is L (Local), and the value of the L flag read from the L flag area are input. If the output of the AND circuit 23 is "1", the selector 29 outputs the value of the read L flag. If the output of the AND circuit 23 is "0", the selector 29 outputs a comparison result of the comparator 36. The comparator 36 outputs "1" if the directory information read from the memory directory is L (Local). Otherwise, the comparator 36 outputs "0". Accordingly, if the directory information of the memory directory is L (Local) when a valid entry is newly created in the directory cache 21, the L flag is set to "1".

To the selector 28, "0", and the value read from a dirty information area of the directory cache 21 are input. If the output of the AND circuit 23 is "0", the selector 28 outputs "0". Alternatively, if the output of the AND circuit 23 is "1, the selector 28 outputs the value read from the dirty information area of the directory cache 21. The output of the selector 28 is input to an OR circuit 31. Also the output of the comparator 30 is input to the OR circuit 31. The comparator 30 makes a comparison between the directory information before and after the directory transition state generation circuit 27 rewrites the directory information according to the memory request command. If the directory information before and after the directory transition state generation circuit 27 are not equal, the comparator 30 outputs "1". Alternatively, if the directory information before and after the directory transition state generation circuit 27 are equal, the comparator 30 outputs "0". If the directory information before and after the directory transition state generation circuit 27 are not equal, or if the dirty information is "1" indicating D (Dirty), the OR circuit 31 outputs "1". The output of the OR circuit 31 is input to an AND circuit 32. Moreover, the output of the directory transition state generation circuit 27 is input to a comparator 34. The comparator 34 outputs a comparison result indicating whether or not the output of the directory transition state generation circuit 27 is L (Local). The comparator 34 outputs "1" if the output of the directory transition state generation circuit 27 is L (Local), or outputs "0" if the output of the directory transition state generation circuit 27 is not L (Local). The output of the comparator 34 is input to an AND circuit 33. To the AND circuit 33, the value of the L flag ("1" in the case of L, or "0" otherwise) is further input. If the read value of the L flag is "1", and if the output of the directory transition state generation circuit 27 is L (Local), the AND circuit 33 outputs "1". The output of the AND circuit 33 is logic-inverted and input to the AND circuit 32. If the output of the OR circuit 31 is "1", and if the output of the AND circuit 33 is "0", the AND circuit 32 outputs "1", and sets the dirty information to "1". Namely, the directory information varies according to a memory request, and the dirty information is set to "1" (indicating that a state is D (Dirty)) if the directory information after being changed is not L (Local) or if the L flag is not "1". If the dirty information before the directory information is changed is "1" and the directory information after being changed is L (Local), and if the L flag is "1", the dirty information is set to "0" (indicating that the state is C (Clean)). Moreover, if the directory information is not changed before and after the directory transition state generation circuit 27, the dirty information is left unchanged.

In FIG. 4, the directory information are compared, selected or the like. At the time of the comparison, the selection or the like, a signal of two bits or more is input to the comparator 30 or the selectors 25, 26, so that the directory information are compared, or selected and output.

Figure 5:
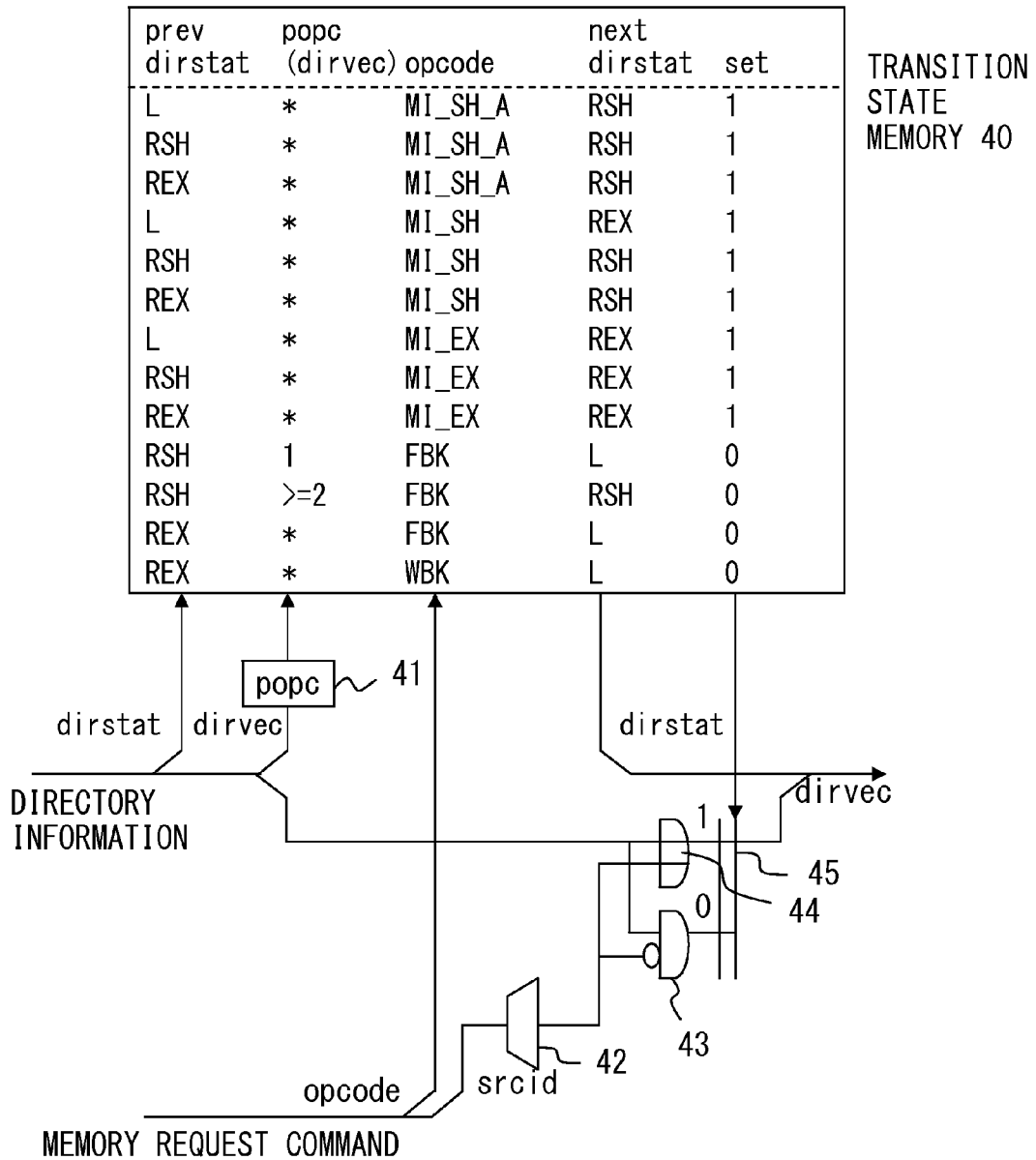
FIG. 5 illustrates a configuration of a directory transition state generation circuit.

FIG. 5 illustrates a configuration of the directory transition state generation circuit.

Input directory information is composed of dirstat indicating a cache state where data is cached in a different node, and dirvec indicating a node where data is cached. For example, if the number of nodes is 16, dirvec is composed of a 16-bit sequence of "0" and "1" extending from a bit 0 to a bit 15. If data is cached in a node having a node number 2, dirvec is represented with a sequence of "0000000000000100" where the bit 2 is "1". dirstat is any of L (Local) indicating a state of data, RSH (Remote SHare), and REX (Remote EXclusive) as described above.

The memory request command is composed of opcode, and an identifier srcid of a node at an issuance source of the command. Instructions of opcode for loading data into a cache include MI_EX, which is an instruction for exclusively storing data in a cache of a request source node, MI_SH, which is an instruction, switched to an exclusive process when needed, for storing data in a cache by being shared among a plurality of nodes, and MI_SH_A, which is an instruction for storing data in a cache by being shared among a plurality of nodes without executing the exclusive process. Instructions of opcode include FBK, which is an instruction for simply flushing back data in a cache, and WBK, which is an instruction for writing back data in a cache.

For dirvec, a population calculation for counting the number of bits set to "1" is performed in popc 41. The number of bits set to "1" is equivalent to the number of nodes that share data. dirstat, an output of popc 41, and opcode are input to a transition state memory 40, and dirstat after a transition is retrieved.

Moreover, srcid is converted from a number of the issuance source node of the memory request command into a sequence of "0" and "1", which is similar to dirvec. For example, if the number of the issuance source node of the command is 5 and the number of nodes is 16, srcid is converted into a sequence of "0000000000100000". An output of a decoder 42 is input to an OR circuit 44, logic-inverted, and input to an AND circuit 43. To the OR circuit 44 and the AND circuit 43, also dirvec is input. The OR circuit 44 outputs the command where the bit corresponding to the issuance source node of the command is changed to "1" in dirvec. The AND circuit 43 outputs the command where the bit corresponding to the issuance source node of the command is changed to "0" in dirvec. The OR circuit 44 outputs dirvec indicating that the issuance source node of the command caches data, and the AND circuit 43 outputs dirvec indicating that the issuance source node of the command releases the cache data. The outputs of the AND circuit 43 and the OR circuit 44 are input to a selector 45. To the selector 45, a set signal from the transition state memory 40 is input. If the set signal is "0", the selector 45 selects the output of the AND circuit 43. Alternatively, if the set signal is "1", the selector 45 selects the output of the OR circuit 44, and outputs the selected output as dirvec.

If opcode of the memory request command is the instruction MI_SH_A, MI_SH, or MI_EX for writing data to the cache, the set signal of the transition state memory 40 is "1". Alternatively, if opcode of the memory request command is the instruction FBK or WBK for flushing back or writing back data, the set signal is "0".

In a case where MI_SH_A is issued as opcode, data is shared as a result regardless of the initial dirstat. Therefore, the next dirstat results in RSH. Alternatively, in a case where MI_EX is issued, data is exclusively held in a cache of a different node as a result regardless of the initial dirstat. Therefore, the next dirstat results in REX. If the initial dirstat is L in a case where MI_SH is issued, a node that holds cache data is not present. Therefore, this case is processed as an exclusive data registration to the cache, and the next dirstat results in REX. In other cases where MI_SH is issued, cache data is shared. Therefore, the next dirstat results in RSH. If the initial dirstat is RSH and the output of popc is "1" in a case where FBK is issued, a node that holds cache data is not present. Therefore, the next dirstat results in L. If the initial dirstat is RSH and the output of popc is 2 or more in a case where FBK is issued, a node that holds cache data remains even after this command is executed. Therefore, the next dirstat results in RSH. If the initial dirstat is REX in a case where FBK or WBK is issued, a node that holds cache data is not present. Therefore, the next dirstat results in L.

In this embodiment, if both directory information of the directory cache and that of a memory directory become L (Local) even when dirty information of the directory cache is D (Dirty), it is possible to change the dirty information of the directory cache to C (Clean). This operation is implemented by the comparators 30, 34, the OR circuit 31, and the AND circuits 32, 33, which are illustrated in FIG. 4. However, if the replacement method of the directory cache is LRU (Least Recently Used) method for selecting an entry that is not used for the longest duration, a clean entry is not positively selected as a replacement target, and a dirty entry that causes a memory access is selected as the replacement target in some cases. Namely, since directory information of the memory and that of the directory cache are different in the dirty entry, contents of the directory cache need to be written back to the memory directory of the memory in order to replace the dirty entry in the directory cache. At this time, a write-back needs to be performed to replace the directory information of the dirty entry. Accordingly, a memory access occurs. However, since a clean entry of the directory cache is the same as the directory of the memory directory, a write-back is not needed, which eliminates the need for causing a new memory access.

Here, recognizing a clean entry as a replacement target produces an effect of reducing occurrences of memory accesses. Even if the clean entry is not LRU, a performance penalty is small.

When a clean entry of the directory cache is replaced, directory information is L (Local). Therefore, memory data at this address is not held in a cache memory of an arbitrary node, or held in a cache memory of a processor at a home node.

In the former case, if a request to reference the same address is issued from the home node or the remote node at the next time, this request misses not only the directory cache but the cache memory. Therefore, a memory access request is originally needed. For this reason, a latency of a memory access, or a penalty of a throughput does not occur.

In the latter case, if a request to reference the same address is issued from the remote node at the next time, the directory information is proved to be L (Local) when the home node accesses the cache. Therefore, it is possible to transfer the data from the cache memory, and a memory access for obtaining the memory data does not occur. Moreover, it is also possible to generate data registered to the directory cache from information that accompanies the access to the cache memory. Therefore, also a memory access for obtaining directory information does not occur. A sole performance penalty is that a replacement target of the directory cache sometimes needs to be written back to the memory due to an occurrence of a miss in the directory cache.

Accordingly, in this embodiment, an entry where dirty information of the directory cache is C (Clean) is selected with priority when a replacement target of the directory cache is decided.

In this way, a clean entry that does not cause a memory access is recognized as a replacement target with priority, thereby making it possible to reduce occurrences of accesses, and to prevent a memory throughput from being degraded.

FIG. 6 illustrates a configuration for recognizing a clean entry among valid entries as a replacement target with priority.

Here, assume that the directory cache 21 is composed of four ways 0 to 3. In each of the ways, age information indicating an order of the ways that hold an older entry in addition to a validity flag, an address, a directory, dirty information, and an L flag. Assuming that the way 3, the way 2, the way 1, and the way 0 hold an older entry in this order, "3", "2", "1", and "0" are held as age information respectively in the way 3, the way 2, the way 1, and the way 0. Age information having a larger value is information including an older entry. As an access order, an entry of a specified index of all the ways is identified, and a way to be accessed next is decided. Accordingly, numbers are sequentially assigned also to the age information in descending order of oldness of entries of the same index in different ways. Age information is rewritten to the smallest value when a directory is updated, and age information of entries of the other ways are set by being sequentially advanced.

The validity flag of the ways 0 to 3 is logic-inverted by the inverter 50, and input to an OR circuit 52 and a priority selector 55. If an invalid entry (where the validity flag is "0") is present in any of the ways 0 to 3, the OR circuit 52 outputs "1". The priority selector 55 selects the way having an invalid entry, and inputs the selected way to a selector 57. If the output of the OR circuit 52 is "1", the selector 57 selects the output of the priority selector 55, and outputs the selected output as replacement way selection information. If the output of the OR circuit 52 is "0", the selector 57 outputs the output of an LRU selection circuit 56 as the replacement way selection information.

Dirty information of each of the ways is logic-inverted by the inverter 51, and input to OR circuits 53 and 54. If any of the inputs is "1", namely, if any of the dirty information is "0" (C (Clean)), the OR circuit 53 outputs "1". The output of the OR circuit 53 is logic-inverted, and input to any of OR circuits 54. If corresponding dirty information is "0" or if dirty information of all the ways are "1" (D (dirty)), the OR circuits 54 respectively output "1". The output of the OR circuits 54 and the value of the age information are input to the LRU selection circuit 56. The LRU selection circuit 56 outputs a signal for selecting a way having the largest age information, namely, the oldest entry among ways having dirty information "0", namely, a clean entry. If none of the ways have a clean entry, the LRU selection circuit 56 outputs a signal for selecting a way having the oldest entry.

The way selection signal of the LRU selection circuit 56 is input to the selector 57. If none of the ways have an invalid entry, a way selection signal decided by the LRU selection circuit 56 is output as the replacement way selection information as described above. For the replacement way selection information, by way of example, four signal lines are provided if the number of ways is four as illustrated in FIG. 6, and a signal "1" is transmitted to a signal line corresponding to a selected way.

Figure 7:
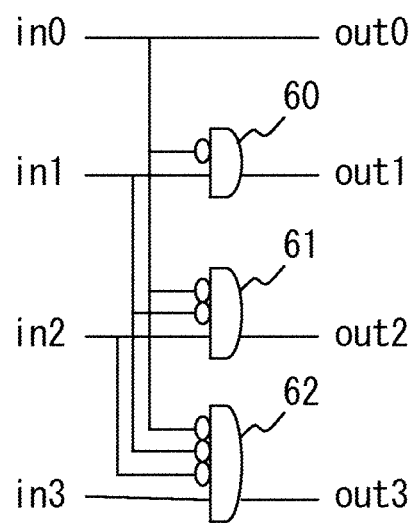
FIG. 7 illustrates a configuration of a priority selector.

FIG. 7 illustrates a configuration of the priority selector.

Inputs in0 to in3 are obtained by logic-inverting the validity flag of the ways 0 to 3. The input in0 is output unchanged as an output out0, and input to AND circuits 60, 61, and 62 after being logic-inverted. Consequently, when the input in0 is "1", the output out0 results in "1", and the other outputs out1 to out3 result in "0". The input in1 is input to the AND circuit 60, and input to the AND circuits 61 and 62 after being logic-inverted. The input in2 is input to the AND circuit 61, and input to the AND circuit 62 after being logic-inverted. The input in3 is input to the AND circuit 62. With the above described configuration, the outputs out0 to out3 result in "1" in response to an input "1" among the inputs in0 to in3. This corresponds to generation of a signal for selecting only one of invalid entries among the entries of the ways 0 to 3.

Figure 8:
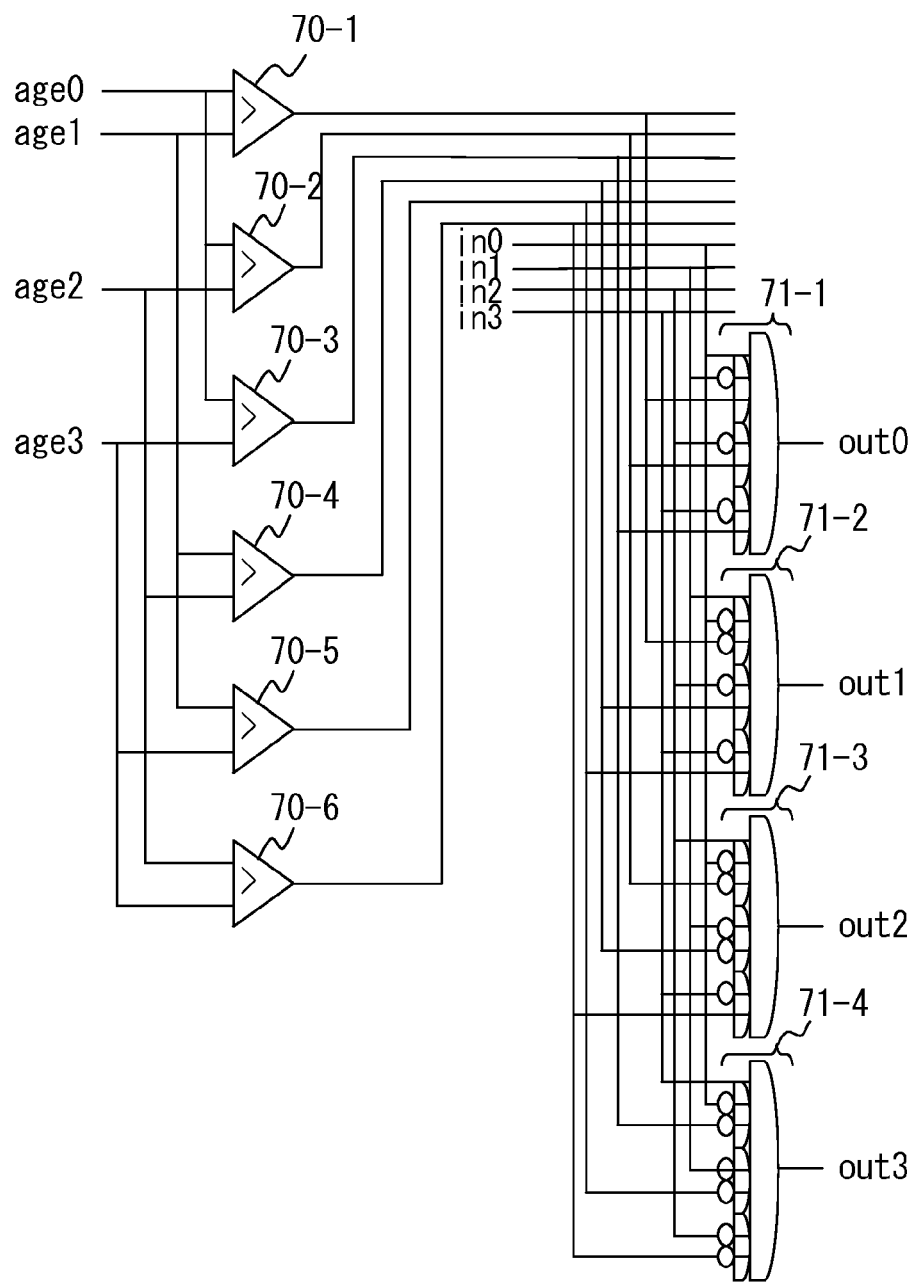
FIG. 8 illustrates a configuration of an LRU selection circuit.

FIG. 8 illustrates a configuration of the LRU selection circuit.

Inputs age0 to age3 are values of the age information of the ways 0 to 3, respectively. A comparator 70-1 performs a comparison of whether or not the input age0 is larger than the input age1. A comparator 70-2 performs a comparison of whether or not the input age0 is larger than the input age2. A comparator 70-3 performs a comparison of whether or not the input age0 is larger than the input age3. A comparator 70-4 performs a comparison of whether or not the input age1 is larger than the input age2. A comparator 70-5 performs a comparison of whether or not the input age1 is larger than the input age3. A comparator 70-6 performs a comparison of whether or not the input age2 is larger than the input age3. In all cases, the output of the comparators 70-1 to 70-6 results in "1" if an input on an upper side of the comparators 70-1 to 70-6 is larger than that on a lower side in FIG. 8.

Then, the inputs in0 to in3 from the OR circuit 54 of FIG. 6, and comparison results of the comparators 70-1 to 70-6 are input to logic circuits 71-1 to 71-4. The inputs in0 to in3 are inputs from the OR circuits 54 that respectively correspond to the ways 0 to 3. If a way having a clean entry is present in the directory cache, the inputs in0 to in3 result in "1". Alternatively, if a way having a clean entry is not present in the directory cache, all the inputs in0 to in3 result in "1". If the value of the age information age0 of the way 0 is largest, namely, if the value of the age information age0 is oldest, and if the input in0 is "1", the logic circuit 71-1 outputs "1" as out0. If the value of the age information age 1 of the way 1 is largest, and if the input in1 is "1", the logic circuit 71-2 outputs "1" as out1. If the value of the age information age2 of the way 2 is largest, and if the input in2 is "1", the logic circuit 71-3 outputs "1" as out2. If the value of the age information age3 of the way 3 is largest, and if the input in3 is "1", the logic circuit 71-4 outputs "1" as out3. The operations performed here are operations for selecting an input having the oldest information among the inputs in0 to in3 that are "1".

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor connected to a different processor via an interconnection network and also connected to a main storage device, the processor comprising:
   a data cache configured to hold data;
   a memory directory configured to hold directory information indicating whether or not data stored in the main storage device is held in a data cache of a different processor;
   a directory cache configured to hold dirty information indicating whether or not the held directory information is the same as the directory information held in the memory directory and local information indicating whether the directory information of the memory directory is indicating that the data stored in the main storage device is not held in a data cache of a different processor when the directory information from the memory directory is registered; and a control circuit configured to make a setting such that the dirty information of the directory cache indicates that the directory information of the directory cache is the same as directory information of the memory directory in a case in which the local information indicates that the directory information of the memory directory is indicating that the data stored in the main storage device is not held in a data cache of a different processor when the directory information of the directory cache is updated to indicate that the data stored in the main storage device is not held in the data cache of the different processor.

2. The processor according to claim 1, wherein when any of a plurality of entries in the directory cache is replaced, an entry having dirty information indicating that the directory information of the directory cache is the same as the directory information of the memory directory is selected as an entry to be replaced.

3. The processor according to claim 2, wherein
the directory cache further holds invalidity information indicating that the held directory information is invalid and
when any of the plurality of entries in the directory cache is replaced, an entry having invalidity information indicating that the held directory information is invalid is selected as an entry to be replaced.

4. The processor according to claim 2, wherein when any of the plurality of entries in the directory cache is replaced and when an entry having dirty information indicating that directory information of the directory cache is the same as the directory information of the memory directory is not present, an entry holding the oldest directory information is selected as an entry to be replaced.

5. The processor according to claim 4, wherein the directory cache further holds age information indicating the degree of oldness of directory information.

6. The processor according to claim 1, wherein the directory cache comprises a plurality of ways.

7. The processor according to claim 1, wherein the directory information includes state information, stored in the main storage device, for indicating a state where corresponding memory data is held in a different processor and identification information for identifying a processor that holds the corresponding memory data.

8. The processor according to claim 7, wherein the state information is either of remote exclusive information indicating that the local information and the memory data are held only in a data cache of a different processor and remote share information indicating that the memory data is shared with a data cache of a different processor.

9. A control method of a processor, connected to a different processor via an interconnection network and also connected to a main storage device, including a data cache configured to hold data, a memory directory configured to hold directory information indicating that data stored in the main storage device is held in a data cache of a different processor and a directory cache configured to hold dirty information indicating whether or not held directory information is the same as the directory information held in the memory directory, the control method comprising:

holding, in the directory cache, local information indicating whether the directory information of the memory directory is indicating that the data stored in the main storage device is not held in a data cache of a different processor when the directory information from the memory directory is registered; and making a setting such that the dirty information of the directory cache indicates the directory information of the directory cache is the same as the directory information of the memory directory in a case in which the local information indicates that the directory information of the memory directory is indicating that the data stored in the main storage device is not held in a data cache of a different processor when the directory information of the directory cache is updated to indicate that the data stored in the main storage device is not held in the data cache of the different processor.

* * * * *